United States Patent [19]

Shidahara et al.

[11] 3,950,944
[45] Apr. 20, 1976

[54] EXHAUST GAS CLEANING SYSTEM FOR THE INTERNAL COMBUSTION ENGINE

[75] Inventors: Yasuhiro Shidahara; Yoshinori Miura, both of Hiroshima, Japan

[73] Assignee: Toyo Kogyo Co., Ltd., Hiroshima, Japan

[22] Filed: Nov. 14, 1973

[21] Appl. No.: 415,712

[52] U.S. Cl. ................................. 60/301; 60/276; 60/285
[51] Int. Cl.² .......................................... F01N 3/16
[58] Field of Search ............ 60/276, 297, 301, 285; 423/219, 213.2, 213.5, 213.7; 204/195 S; 23/288 F

[56] References Cited
UNITED STATES PATENTS

| | | |
|---|---|---|
| 3,514,377 | 5/1970 | Spacil .......................... 204/195 S |
| 3,759,232 | 9/1973 | Wahl ................................ 60/285 |
| 3,768,259 | 10/1973 | Carnahan .......................... 60/285 |
| 3,773,894 | 11/1973 | Bernstein .......................... 60/301 |
| 3,803,839 | 4/1974 | Santiago .......................... 60/289 |
| 3,809,743 | 5/1974 | Unland .......................... 423/213.5 |

*Primary Examiner*—Douglas Hart
*Attorney, Agent, or Firm*—Sughrue, Rothwell, Mion & Zinn

[57] ABSTRACT

An exhaust gas cleaning system for the internal combustion engine in which an electrolytic deoxidizing device is attached to the exhausting system of the internal combustion engine for removing the oxygen molecules in the exhaust gas and converting it into the reducing gas, and means for removing nitrogen oxide, carbon monoxide and hydrocarbons are provided at the rear of the electrolytic deoxidizing device.

2 Claims, 9 Drawing Figures

EXHAUST GAS CLEANING SYSTEM FOR THE INTERNAL COMBUSTION ENGINE

BACKGROUND OF THE INVENTION

1. Field of the Invention

This invention relates to a system for cleaning the exhaust gas generated from the internal combustion engine, and more particularly to the exhaust gas cleaning system capable of removing the oxygen molecules in the exhaust gas to convert it into the reducing gas and cleaning thereafter nitrogen oxides.

2. Description of the Prior Art

It is well known that injurious carbon monoxide, hydrocarbons and nitrogen oxides (NOx) are contained in the exhaust gas of the automobile engine or the like internal combustion engine and that the former two, i.e., the carbon monoxide and the hydrocarbons, can be removed by the thermal reactor or the catalyzer cleaner which combustions again causes combustion of the exhaust gas at high temperature. Although the nitrogen oxides can be removed by the catalyzer reactor, the high cleaning efficiency is not expected to discharge most of the nitrogen oxides and to cause the photochemical smog.

Two processes have been proposed for removing the nitrogen oxides from the exhaust gas. In one, the catalyzer decomposes the nitrogen oxides into nitrogen and oxygen. In the other, the nitrogen oxides are reacted with carbon monoxide, hydrocarbons and hydrogen in the exhaust gas. The former process requires a large amount of catalyzer due to the slow reacting rate and accordingly is not useful for treating large volumes of the exhaust gas discharged, for example, from the automobile engine. On the other hand, with the latter process it is substantially impossible to remove the nitrogen oxide, as the oxygen in the exhaust gas suppresses a reaction between the nitrogen oxide and the carbon monoxide.

Cleaning of exhaust gases and reducing the fuel consumption have recently become necessary in view of the pollution problems and the shortage of the fuel. In the case where fuel-air ratio of the gas mixture to be introduced into the engine is lean, e.g., a ratio higher than 15, to reduce the fuel consumption, large amounts of oxygen molecules are contained in the exhaust gas from the engine, thus making it difficult to clean the nitrogen oxides.

The kind of reaction caused in the exhaust gas catalyzer is shown by the following experiments:

| composition of the exhaust gas ; | |
|---|---|
| CO | 2% |
| hydrocarbons | 0.04% |
| nitrogen oxides | 0.1% |
| $CO_2$ | 10% |
| $H_2$ | 1% |
| $O_2$ | 0-2% |
| $H_2O$ | 10% |
| $N_2$ | remainder |

The cleaning efficiency of the CO, hydrocarbons and nitrogen oxides is measured by passing the exhaust gas through a precious metal catalyzer at 400°C and with the space velocity of $30,000H^{-1}$. The cleaning efficiency is shown in FIG. 1, wherein the cleaned ratio of the constituents in the exhaust gas caused by the oxidation or reduction thereof is shown as the oridinate, whereas the chemical valence ratio of the oxygen is shown as the abscissa. The chemical valence ratio of the oxygen is determined in a basis of an oxygen amount required for burning fully the CO 1 mol. in the exhaust gas. In practice, the chemical valence ratio of the oxygen is indicated as 1.0, when 0.5 mol. of oxygen gas is required for burning fully the exhaust gas containing 1 mol. of CO gas. The larger the chemical valence ratio becomes, the more the oxygen amount is increased. Accordingly, when the oxygen content in the exhaust gas composition is 0 percent, the chemical valence ratio of the oxygen is 0; and when the oxygen content is 2 percent, the chemical valence ratio is 2.

It will be apparent from the graph of the FIG. 1 that efficiency of cleaning the nitrogen oxide is high with the chemical valence ratio lower than 0.6 and reduced sharply with the chemical valence ratio more than 0.6. When the chemical valence ratio is 1.0, the efficiency of cleaning the carbon monoxide, hydrocarbons and nitrogen oxides becomes about 80 percent.

It is considered from test results that the carbon monoxide in the exhaust gas reacts first with the oxygen, and therefore, when only small amounts of oxygen exist in the exhaust gas, the oxygen is fully consumed for oxidizing a part of the carbon monoxide. The nitrogen oxide reacts with the residual carbon monoxide to produce nitrogen gas and carbon dioxide gas. When the oxygen exists in relative large quantities in the exhaust gas, the oxygen oxidizes fully the carbon monoxide and the hydrocarbons. Meanwhile, the carbon monoxide is not reacted with the nitrogen oxides because of the existence of the oxygen, and the nitrogen oxides are scarcely cleaned as the decomposition of the nitrogen monoxide itself.

After the above described experimental works and considerations thereof it has become clarified that, if the exhaust gas is passed through the catalyzer cleaner or the thermal reactor after removing the oxygen from the exhaust gas and converting it into the reducing gas, the nitrogen oxides will be removed from the exhaust gas.

SUMMARY OF THE INVENTION

An object of this invention is to provide a system for removing the oxygen molecules in the exhaust gas and then cleaning the nitrogen oxides.

Another object of this invention is to provide an exhaust gas cleaning system, in which a deoxidizing device which removes first the oxygen molecules in the exhaust gas generated from the engine and then converting the exhaust gas into a reducing gas is provided at a gas exhausting part of the engine, and a cleaner device which receives the deoxidized exhaust gas discharged from said deoxidizing device and leans the nitrogen oxides in the exhaust gas is provided in series of the deoxidizing device.

A object of this invention is to provide an exhaust gas cleaning system wherein the engine, the deoxidizing device for removing the oxygen molecules from the exhaust gas to convert it into the reducing gas, a cleaner device for receiving the deoxidized gas and cleaning the nitrogen oxides therein, and another cleaner device for cleaning the carbon monoxide and hydrocarbons, are arranged in series.

A object of this invention is to provide an exhaust gas cleaning system wherein the engine, the deoxidizing device, the cleaner for the nitrogen oxides and the cleaner for the carbon monoxide and the hydrocarbons are arranged in series, and the oxygen gas removed from the exhaust gas by the deoxidizing device is introduced into a suction part of the engine or the cleaner for cleaning the carbon monoxide and hydrocarbons.

A object of this invention is to provide an exhaust gas cleaning system wherein a deoxidizing device for removing electrochemically the oxygen molecules from the exhaust gas by means of a fixed electrolyzing element is attached to the exhausting part of the engine and the deoxidized gas discharged from the dioxidizing device is introduced into the cleaner for the nitrogen oxides.

A further object of this invention is to provide an exhaust gas cleaning system wherein the amount of the oxygen to be removed from the exhaust gas by the deoxidizing device is controlled to the desired level so as to increase the efficiency of cleaning the nitrogen oxides, carbon monoxide and hydrocarbons in the following cleaners.

PREFERED EMBODIMENTS OF THIS INVENTION

As particularly described above, the chemical valence ratio of the oxygen must be kept at a range below about 0.6 to reduce and remove the nitrogen oxides in the exhaust gas, but the oxygen amount in the exhaust gas changes with the running condition of the car or the other conditions.

Accordingly, the electrolytic deoxidizing device is preferable to remove the exhaust gas and to keep the residual oxygen amount at the desired level.

Figure 2:
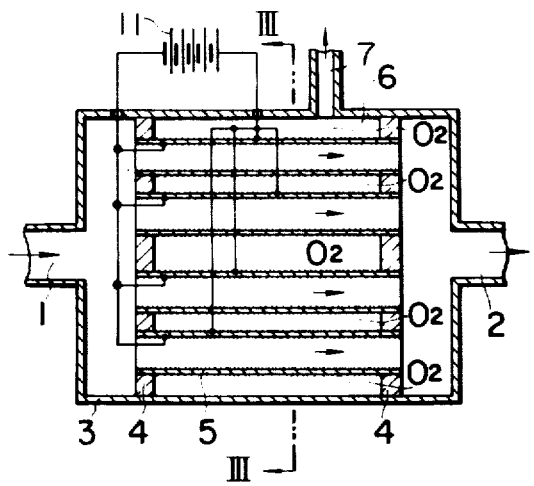
FIG. 2 is a vertically cross sectioned elevation of an electrolytic deoxidizing device according to this invention.
Figure 3:
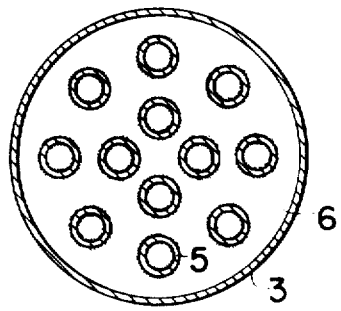
FIG. 3 is a cross section of the electrolytic deoxidizing device shown in the FIG. 2 cut along line III—III.
Figure 4:
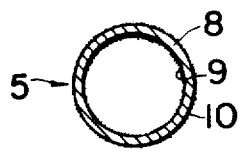
FIG. 4 is an enlarged cross section of an electrolyzing tube.

The preferable electrolytic deoxidizing device of this invention is explained with reference to the FIGS. 2–4: A pair of baffle plates 4, 4 is provided in a cylinder 3 having an exhaust gas inlet 1 and an exhaust gas outlet 2. Pluralities of electrolyzing tubes 5 are arranged in parallel to the axis of the cylinder 3, and both ends of each said electrolyzing tube 5 are held by the baffle plate 4 and opened to the inlet 1 and the outlet 2. An oxygen chamber 6 is formed between the baffle plates 4, 4 in the cylinder 3 including the electrolyzing tubes 5, and an oxygen outlet 7 communicating with the oxygen chamber 6 is provided in the cylinder 3.

Each of the electrolyzing tubes 5 is produced by coating porous and conductive metal layers 9, 10 on outer and inner surfaces of a tube 8 made from a solid electrolyte having the oxygen ion transferring property. The inner layer 9 and the outer layer 10 are connected to a power source 11, as the cathode and the anode, respectively. The porous and conductive inner and outer metal layers 9 and 10 serve to ionize the oxygen molecules at an interface among the oxygen containing gas, the solid electrolyte and the electrode and to discharge the oxygen ions into the oxygen molecules.

The solid electrolyte is a solid compound having an oxygen ion transferring property at a certain elevated temperature, and includes $ZrO_2$-$CaO$, $ThO_2$-$Y_2O_2$, $ZrO_2$-$Y_2O_2$ and, $ThO_2$-$CaO$.

The metal to be coated on the inner and outer surfaces of the tube 8 must be conductive and highly resistant to thermal and corrosive attacks, and includes platinum, nickel, stainless steel and cobalt. The metal is coated on the inner and outer surfaces of the tube 8 as the porous layer; for example, a mixture composed of 200 mesh platinum powder and a surface active agent is first applied on the inner and outer surfaces of the tube 8 and then the coated layers are heated at 1000°C for 2 hr. to sinter the platinum powder. If the mixture contains easily oxidizing metal powder, the heating and sintering treatment is carried out in an inert gas atmosphere. Another useful coating method is to plate porous nickel on the inner and outer surfaces of the tube.

Figure 5:
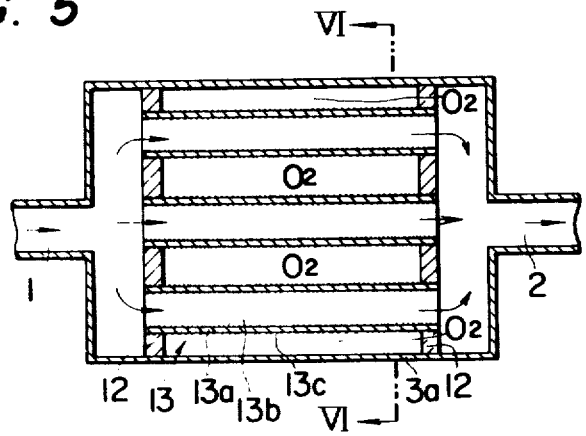
FIG. 5 is a cross sectioned elevation of another electrolytic deoxidizing device according to this invention.
Figure 6:
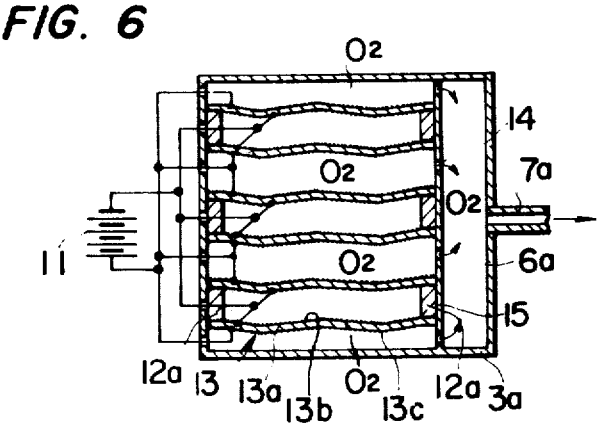
FIG. 6 is a cross section of the electrolytic deoxidizing device shown in the FIG. 5 cut along line VI—VI.

The function of this electrolytic deoxidizing device is described below:

While the oxygen-containing exhaust gas introduced from the inlet 1 passes through the electrolyzing tubes 5, the oxygen in the exhaust gas is absorbed by an interface between the inner porous metal layer 9 and the inner surface of the solid electrolyte tube 8, activated on said interface, and converted into oxygen ion. The solid electrolyte tube 8, which is a part of the electrolyzing tube 5, causes many oxygen ion voids and exhibits the ion transferring property by the heat of the exhaust gas, and the oxygen ions on the cathode pass through said electrolyte to move on the anode or the outer porous metal layer 10 and discharge thereon into oxygen gas. Thus, the oxygen in the exhaust gas passes through the electrolyzing tube 5 in the form of oxygen ion, is collected in the oxygen chamber 6 and released outwards through the oxygen outlet 7. Meanwhile, the oxygen-free exhaust gas is introduced in turn into the cleaners for the nitrogen oxides, hydrocarbons and carbon monoxide. The electrolyzing tube is not restricted to the cylindrical shape, and may be plate shaped as shown in the FIGS. 5 and 6. In this example, pluralities of corrugated electrolyzing plates 13 are arranged in the parallel rack shape and held by a pair of baffle plates 12, 12a. An oxygen chamber 6a is formed between one end wall of a vessel 3a and a side baffle plate 15 having an oxygen passage 14. An oxygen outlet 7a is provided on the side wall of the vessel 3a. Each of the electrolyzing plates 13 is produced by coating porous layers 13b, 13c of conductive metal on upper and rear surfaces of a solid electrolyte 13a. A cathode of a power supply 11 is connected to the metal layer 13b which is brought into contact with the exhaust gas, whereas an anode is connected to the metal layer 13c which communicates with the oxygen passage 14. In this example, the total surface area of the electrolyzing plates 13 becomes large to improve the deoxidizing efficiency.

The voltage of the direct current to be applied on the electrolyzing tubes (or plates) is not more than 12 V, and the oxygen in the exhaust gas is removed effectively at such voltage, thus enabling the purification of nitrogen oxides in the following cleaner device. If the voltage exceeds 12 V, the deoxidizing device removes the oxygen in the exhaust gas to convert it into the reducing gas and decomposes the nitrogen oxides into nitrogen and oxygen to some extent. The deoxidizing device, however, serves mainly to remove the oxygen in the exhaust gas and serves little to purify the nitrogen oxides. Especially, the deoxidizing device can not fully decompose the nitrogen oxides into nitrogen and oxygen for the exhaust gas from the engine, since a large amount of the exhaust gas is discharged with high velocity. For this reason, this invention is intended to remove the oxygen from the exhaust gas to convert it into the reducing gas in the first stage, and to purify fully the nitrogen oxides with the catalyzer or cleaners in the second stage.

The oxygen separated by the electrolytic deoxidizing device can be released into atmospheric air, or may be utilized as the secondary air for removing the carbon monoxide, hydrocarbons and the like uncombusted injurious constituents in the exhaust gas or may be introduced in the inlet manifold.

According to this invention, the exhaust gas from the engine is treated to remove the oxygen by means of the electrolytic deoxidizing device thereby to convert the exhaust gas into the easily purifying gas or the reducing gas, and then the treated exhaust gas is introduced into the nitrogen oxide cleaner.

Accordingly, the nitrogen oxide in the exhaust gas can be purified easily and effectively by the cleaner.

Besides, the nitrogen oxides, carbon monoxide and hydrocarbons can be removed simultaneously by controlling the amount of the oxygen to be removed in the deoxidizing device, though the latter two are usually removed after the purifying of the nitrogen oxides. The usual catalyzer cleaner or thermal reactor may be utilized for purifying the carbon monoxide, hydrocarbons and nitrogen oxides as the composition of the exhaust gas is controlled by the deoxydizing device.

Figure 7:
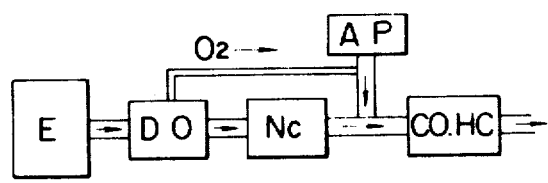
FIGS. 7, 8 and 9 show various combinations of the electrolytic deoxidizing device and the exhaust gas cleaners according to this inventions.
Figure 8:
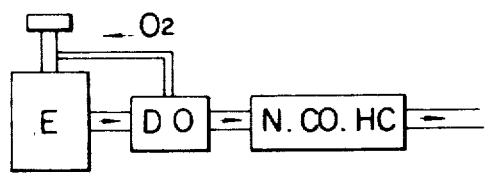
Figure 9:
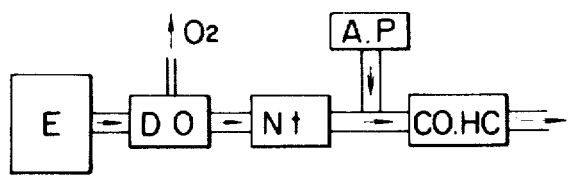

According to this invention, the electrolytic deoxidizing device, the cleaner and means for utilizing the separated oxygen may be combined in various embodiments, as shown in the FIGS. 7–9. In the FIGS. 7–9, Do indicates the deoxidizing device, Nc indicates the catalyzer cleaner for the nitrogen oxides, Nt indicates the thermal reactor for the nitrogen oxides, CO. HC indicates the catalyzer cleaner or thermal reactor for the carbon monoxide or hydrocarbons, N.CO.HC indicates the catalyzer cleaner for the nitrogen oxides, carbon monoxide and hydrocarbons, and AP indicates a pump for feeding the secondary air.

EXAMPLE 1

Referring to the FIG. 7, the voltage applied to the electrolytic deoxidizing device Do was lower than 12 V, and the chemical valence ratio of the oxygen in the exhaust gas flowing from the electrolytic deoxidizing device Do to the catalyzer cleaner Nc for the nitrogen oxides was determined below 0.6. The nitrogen oxides in the catalyzer cleaner Nc reacted with carbon monoxide to be decomposed into nitrogen and carbon dioxide, and flowed through the catalyzer cleaner Nc together with the residual carbon monoxide and hydrocarbons. This exhaust gas was mixed with the secondary air, and treated in the cleaner CO.HC to remove the carbon monoxide and the hydrocarbons. The oxygen separated from the exhaust gas in the electrolyzing deoxidizing device Do was mixed with the secondary air.

EXAMPLE 2

Referring to the FIG. 8, the voltage to be applied on the electrolytic deoxidizing device Do was 12 V, and the chemical valence ratio of the oxygen in the exhaust gas flowing from the deoxidizing device Do to the catalyzer cleaner N.CO.HC was determined at 1.0.

Figure 1:
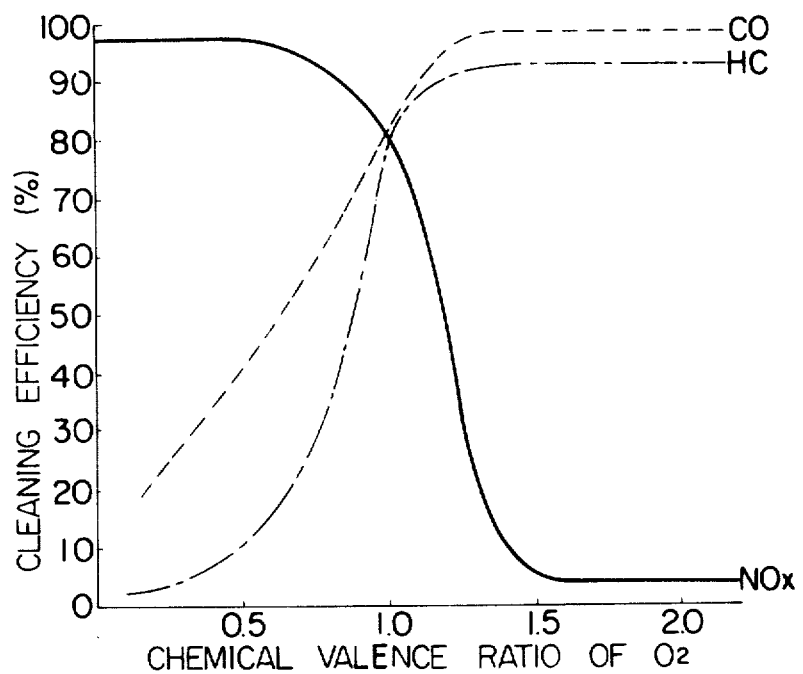
FIG. 1 is a graph showing a relation between the chemical valence ratio of the oxygen and the efficiency of cleaning the NOx, CO and hydrocarbons.

In this example, the nitrogen oxides, carbon monoxide and hydrocarbons were simultaneously removed by the catalyzer cleaner N.Co.HC as shown in the graph of the FIG. 1. The oxygen separated from the exhaust gas in the electrolytic deoxidizing device Do was fed into the inlet manifold of the internal combustion engine E.

EXAMPLE 3

Referring to the FIG. 9, the voltage to be applied on the electrolytic deoxidizing device Do was lower than 12 V, and the oxygen was fully removed from the exhaust gas in the deoxidizing device Do. The oxygen separated was released into atmospheric air. The thermal reactor was utilized as the cleaner for the nitrogen oxides, wherein the nitrogen oxides was reacted with a part of the carbon monoxide at a temperature higher than about 500°C and decomposed into carbon dioxide and nitrogen. The carbon monoxide and the hydrocarbons were successively purified by the catalyzer cleaner or the thermal reactor, and the resultant harmless exhaust gas was released into the atmospheric air.

As particularly described above, the exhaust gas cleaning system of this invention is formed to reduce the oxygen content in the exhaust gas below a predetermined low value or at almost zero, whereby the ratio of cleaning the nitrogen oxides in the exhaust gas is remarkably improved. Therefore, the exhaust gas cleaning system of this invention is very effective to treat the exhaust gas generated from the internal combustion engine.

While this invention has been described with reference to particular embodiments thereof, it will be understood that the numerous modification may be made those skilled in the art without actually departing from the scope of the invention.

Therefore, the appended claims are intended to cover all such equivalent variation as coming within the true spirit and scope of the invention.

What is claimed is:

1. A system for cleaning the exhaust gas emanating from an internal combustion engine, said exhaust gas including at least oxygen and nitrous oxides, said system comprising:
    a. a solid-ion electrolytic device for electrically separating oxygen from said exhaust gas, said device having an inlet for receiving said exhaust gases and an outlet for passing said exhaust gas after separation, and
    b. nitrogen oxide detoxification means, having an inlet connected to receive said exhaust gas after separation, and an outlet, for reducing the nitrogen oxides in said exhaust gas into non-toxic gas;
    said oxygen-ion electrolytic device comprising a chamber having an inlet and first and second outlets, separator elements in said chamber positioned to physically isolate said second outlet from said inlet whereby gas entering said inlet will flow to said first outlet but will be blocked from said second outlet, said separator elements comprising a solid oxygen-ion electrolyte having a pair of electrodes attached thereto, and means for applying a voltage between said electrodes.

2. A system as claimed in claim 1 wherein said second outlet is vented to the atmospheric air.

* * * * *

UNITED STATES PATENT AND TRADEMARK OFFICE
CERTIFICATE OF CORRECTION

PATENT NO. : 3,950,944
DATED : April 20, 1976
INVENTOR(S) : Yasuhiro SHIDAHARA et al It is certified that error appears in the above-identified patent and that said Letters Patent are hereby corrected as shown below:

[75] Inventors - delete [Miura] and substitute -- Niura --

Signed and Sealed this

Twenty-first Day of September 1976

[SEAL]

Attest:

RUTH C. MASON
*Attesting Officer*

C. MARSHALL DANN
*Commissioner of Patents and Trademarks*